United States Patent
Wheeler et al.

(10) Patent No.: US 10,484,327 B1
(45) Date of Patent: Nov. 19, 2019

(54) SYSTEMS AND METHODS FOR PRESENTING IN-APPLICATION MESSAGES

(71) Applicant: Braze, Inc., New York, NY (US)

(72) Inventors: Brian Wheeler, New York, NY (US); Jared Poelman, Long Island City, NY (US)

(73) Assignee: Braze, Inc., New York, NY (US)

( * ) Notice: Subject to any disclaimer, the term of this patent is extended or adjusted under 35 U.S.C. 154(b) by 0 days.

(21) Appl. No.: 16/458,786

(22) Filed: Jul. 1, 2019

(51) Int. Cl.
*G06F 15/16* (2006.01)
*H04L 12/58* (2006.01)
*G06F 11/07* (2006.01)

(52) U.S. Cl.
CPC .......... *H04L 51/30* (2013.01); *G06F 11/0793* (2013.01); *H04L 51/046* (2013.01); *H04L 51/06* (2013.01); *H04L 51/10* (2013.01)

(58) Field of Classification Search
CPC .......... G06F 11/079; G06F 9/542; G06F 9/54; G06F 11/0703; G06F 17/248; H04L 43/16; H04L 43/00; H04L 43/0876; H04L 67/32; H04L 43/08; H04L 51/043; H04L 51/046
See application file for complete search history.

(56) References Cited

U.S. PATENT DOCUMENTS

| | | | |
|---|---|---|---|
| 2010/0125853 A1* | 5/2010 | Qian | G06F 11/079 719/313 |
| 2010/0323667 A1* | 12/2010 | Oschwald | H04W 4/21 455/412.2 |
| 2013/0042256 A1* | 2/2013 | Qian | G06F 11/079 719/318 |
| 2013/0086595 A1* | 4/2013 | Findeisen | G06F 9/54 719/313 |
| 2014/0068632 A1* | 3/2014 | Tan | G06F 9/54 719/313 |
| 2015/0019724 A1* | 1/2015 | Qian | G06F 11/079 709/224 |
| 2017/0220240 A1* | 8/2017 | Kataria | G06F 3/04883 |
| 2019/0005688 A1* | 1/2019 | Perez Alvarez | G06T 11/203 |

* cited by examiner

*Primary Examiner* — Abdullahi E Salad
(74) *Attorney, Agent, or Firm* — FisherBroyles, LLP (57) ABSTRACT

Systems and methods for causing an in-application message to be presented to a user of a software application track when in-application message presentation failures occur. If message presentation failures occur too frequently, the size of image or media files being sent to software application to generate in-application messages is reduced in an attempt to reduce the number of message presentation failures that are occurring.

23 Claims, 6 Drawing Sheets

SYSTEMS AND METHODS FOR PRESENTING IN-APPLICATION MESSAGES

BACKGROUND OF THE INVENTION

The invention is related to systems and methods for enhancing customer engagement. In part, this is accomplished by sending messages to users. The messages could be mobile or browser-based push notifications, text (SMS/MMS) messages, email messages, in-application messages, or an audio recording that is sent to users via a telephony system. The present invention is focused on reliably delivering in-application messages to users.

Companies often hire a customer engagement service to help manage the delivery of messages to their customers. The customer engagement service can cause messages to be delivered to customers at opportune times when the messaging may have the most influence over customer behavior. Similarly, the customer engagement service may know when certain types of messages will have the greatest value to customers, and then seek to deliver the messages at those times.

Companies often provide a software application to their customers that the customers install on a computing device such as a laptop computer, a desktop computer, a tablet or a smartphone. The software applications can provide a wide array of functionality or information to customers depending on what types of goods and services the company provides to its customers. For example, an online retailer may provide its customers with a software application that makes it easy for customers to make online purchases. A media company may provide its customers with a software application that makes it easy for the customers to access and watch media content.

Regardless of the type of software application that a company provides to its customers, it is often possible to deliver messages to the customers via the software application while they are using the company's software application. Such messages are referred to as in-application or "in-app" messages.

A customer engagement service hired by a company can control the flow and timing of the delivery of in-app messages. Indeed, the customer engagement service may deliberately coordinate the in-app messages with the delivery of messages sent to the customers via alternate delivery channels to help improve the customers' overall experience.

An in-application message can be sent to a user's computing device in multiple different ways so that a software application on the user's computing device can then present the in-application to the user. In some instances, the entire content of the in-application message is sent to the software application. In other instances, a messaging module of the software application may generate and present an in-application message to the user based on messaging instructions sent to the software application. Either the in-application message itself, or instructions to generate and present an in-application message, can be sent to the user's computing device via a data network, such as the Internet, or via a push notification.

Regardless of whether the in-application message itself is sent to the user's computing device or whether instructions to generate and present an in-application message are sent to the user's computing device, in-application message presentation failures can occur. One of the common reasons for failures in the presentation of in-application messages relates to the size of image or media files that are used to create and present an in-application message. If one or more image files that are used to generate an in-application message is quite large, it can lead to a presentation failure. In some instances, this occurs because the user's computing device has a poor or slow connection to a data network or a cellular network which is being used to send the image file to the user's computing device. In other instances, a presentation failure can occur if there is insufficient memory space on the user's computing device to store large image files.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Systems and methods embodying the invention can be part of a customer engagement service and/or part of a software application that a company provides to its customers. As mentioned above, a customer engagement service helps a company interact with its users to enhance the customer experience and to increase the company's business, revenue and/or stature. One of the ways that a customer engagement service assists a company is by helping the company to manage how and when messages are delivered to the company's customers.

The following description refers to "clients" and to "users". For purposes of this discussion, a "client" would be a client of the customer engagement service. In other words, a company or business that is being assisted by the customer engagement service. "Users" are a client's users, not users of the customer engagement service. The customer engagement service sits between a client and the client's users to manage and orchestrate the delivery of messages sent from the client to its users.

A "message" could take many different forms and be delivered to a user in many different ways. For example, a "message" could be a mobile or browser-based push notification sent to users by a push notification service.

A message could also be an in-app message that is delivered to a user via a client's software application. The client's software application could be resident on a user's computer, a user's smartphone or any other device with a processor that is capable of running such a software application. The in-app messages generated and/or delivered by such a software application could be received by the user in various ways.

Also, a client's software application could be instructed to present an in-app message to a user in various different ways. In some instances, the customer engagement service could have a push notification service deliver a push notification to a user's computing device, where the push notification is configured to be delivered to the client's software application on the user computing device. The push notification could include information that instructs the software application to deliver a certain in-app message to the user. Also, information in the push notification could be used by the software application to generate an in-app message that is then presented to the user, and also to schedule when the in-app message is presented to the user.

In other instances, the customer engagement service could send a communication to a software application on the user's computing device via a data network, such as the Internet. The communication could include message data that instructs the software application to deliver a certain in-app message to the user. Also, information in the communication sent to the software application via the data network could be used by the software application to generate an in-app message that is then presented to the user, and also to schedule when the in-app message is presented to the user.

A message also could be a text message (SMS/MMS) that is delivered to users via a smartphone or via a text messaging software application. A message also could be a message delivered to a user via a social media service, or via an Over The Top (OTT) messaging service. A message also could be an email message that is delivered to users via standard email service providers. Moreover, a message could be an audio message delivered to a user via a telephony or VOIP service provider, or a video message delivered via similar means.

For purposes of the following description and the appended claims, any reference to sending a "message" to users is intended to encompass any of the different types of messages and delivery channels mentioned above, as well as any message types and delivery means that are developed in the future. That said, the following description focuses on in-app messages that are delivered to a user via a client's software application.

Figure 1:
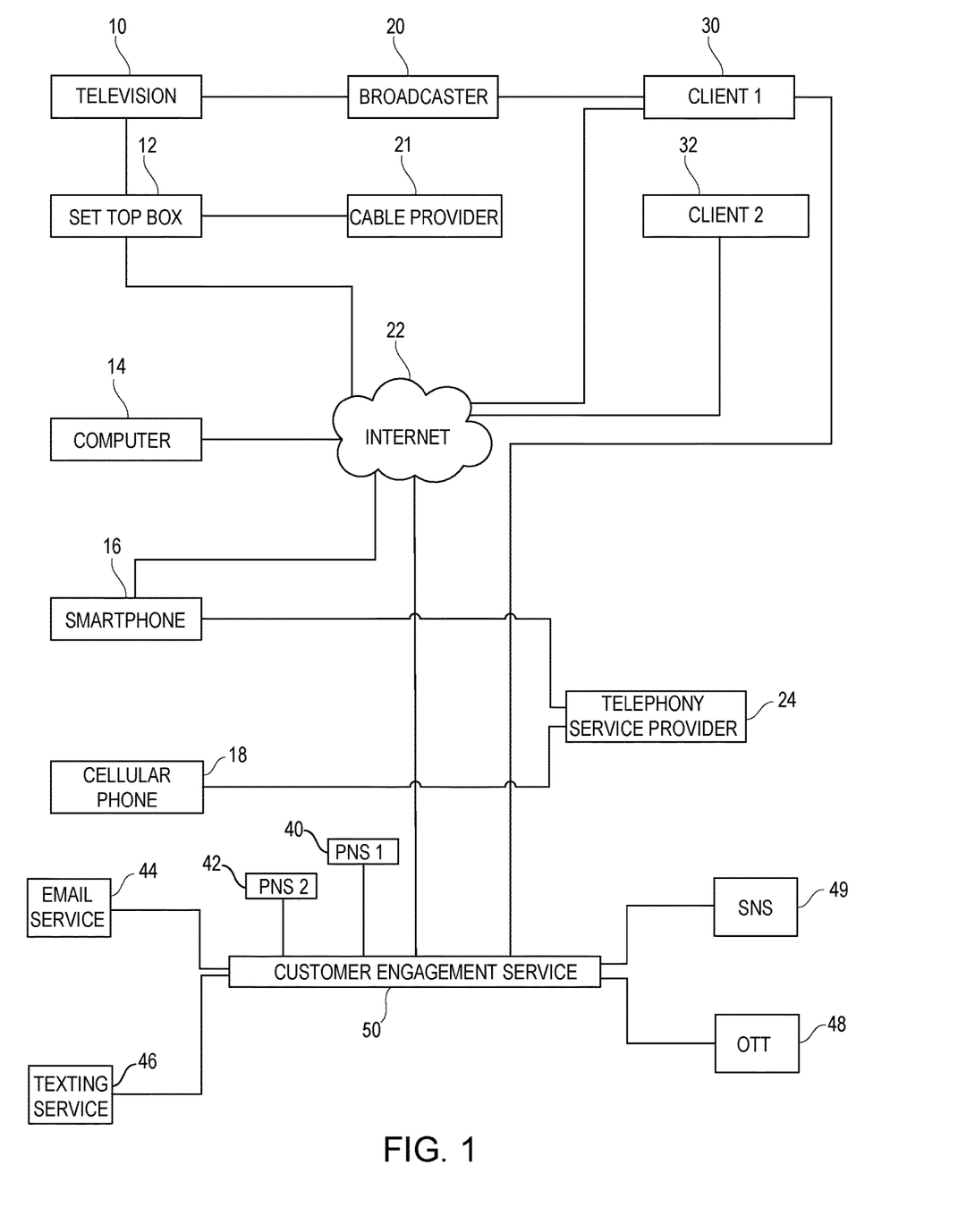
FIG. 1 is a diagram of a communications environment which could be utilized by systems and methods embodying the invention.

FIG. 1 illustrates a communications environment in which systems and methods embodying the invention could be practiced. As shown in FIG. 1, the communications environment includes client one 30, client two 32 and the customer engagement service 50. Client one 30 and client two 32 are clients of the customer engagement service 50. The clients 30/32 can communicate with the customer engagement service directly, via the Internet 22, or via other means.

Users of the clients 30/32 could utilize the clients' 30/32 services in various ways. For example, if client one 30 is a media company that provides media content to its users, client one 30 could produce media content that is sent via a broadcaster 20 to a client's television 10. That media content could be delivered to the user's television 10 via a set top box 12 that is connected to the user's television and to the Internet 22 and/or a cable service provider 21. In some instances, a software application on the set top box 12 that is provided by client one 30 could be used to deliver the content to the user's television 10.

The same or a different user might have a computer 14 that is connected to the Internet 22. The user could utilize a web browser on the computer 14 to access an Internet website provided by client one 30 that also offers media content. Similarly, a software application provided by client one 30 and that is resident on the user's computer 14 might also be used to access media content provided by client one 30 via the Internet 22.

Yet another user may have a smartphone 16 that is capable of communicating over the Internet 22 and/or via a telephony service provider 24. A software application provided by client one 30 and that is resident on the user's smartphone 16 could be used to access media content provided by client one 30 via the Internet 22 or via the telephony service provider 24.

Still another user might have a cellular telephone 18 that is capable of receiving text messages. This would allow the user of the cellular telephone to receive text messages from client one 30.

FIG. 1 also shows that a first push notification service (PNS) 40 and a second push notification service 42 could be used by the customer engagement service 50 to deliver push notifications to smartphones and/or web browsers. Such messages could be delivered by the push notification services 40/42 to user smartphones via the Internet 22 or via a telephony service provider 24 that provides user smartphone with its native telephony service.

FIG. 1 also shows that an email delivery service 44 could be used by the customer engagement service 50 to send email messages to users. Further, the customer engagement service 50 could use a text messaging service 46 to send text messages to users, or an OTT messaging service 48 to send formatted messages to users. Moreover, the customer engagement service 50 might send a message to users via one or more social networking services 49. Of course, the customer engagement service 50 could utilize any other message delivery service as well to communicate messages to users.

The clients 30/32 in this communications environment could be any sort of client that utilizes a customer engagement service 50 to help them manage engagement with their users. As noted above, a client could be a media broadcaster that produces and sends media content to its users. In other instances, a client could be a retailer whose purchasers are its users. In still other instances, the client could be a service provider, such as a telephony service provider or an Internet service provider. Virtually any business that wishes to send messages to its users could be a client in this environment.

One of skill in the art will appreciate that FIG. 1 only illustrates a very limited number of devices that would be used by users to receive messages from a client, and that could be used to interact with a client. In reality, there would be a very large number of user devices in such a communications environment. Also, a single user could possess and use multiple devices to access a client's services and to receive messages from a client. Thus, the depiction in FIG. 1 should in no way be considered limiting.

Figure 2:
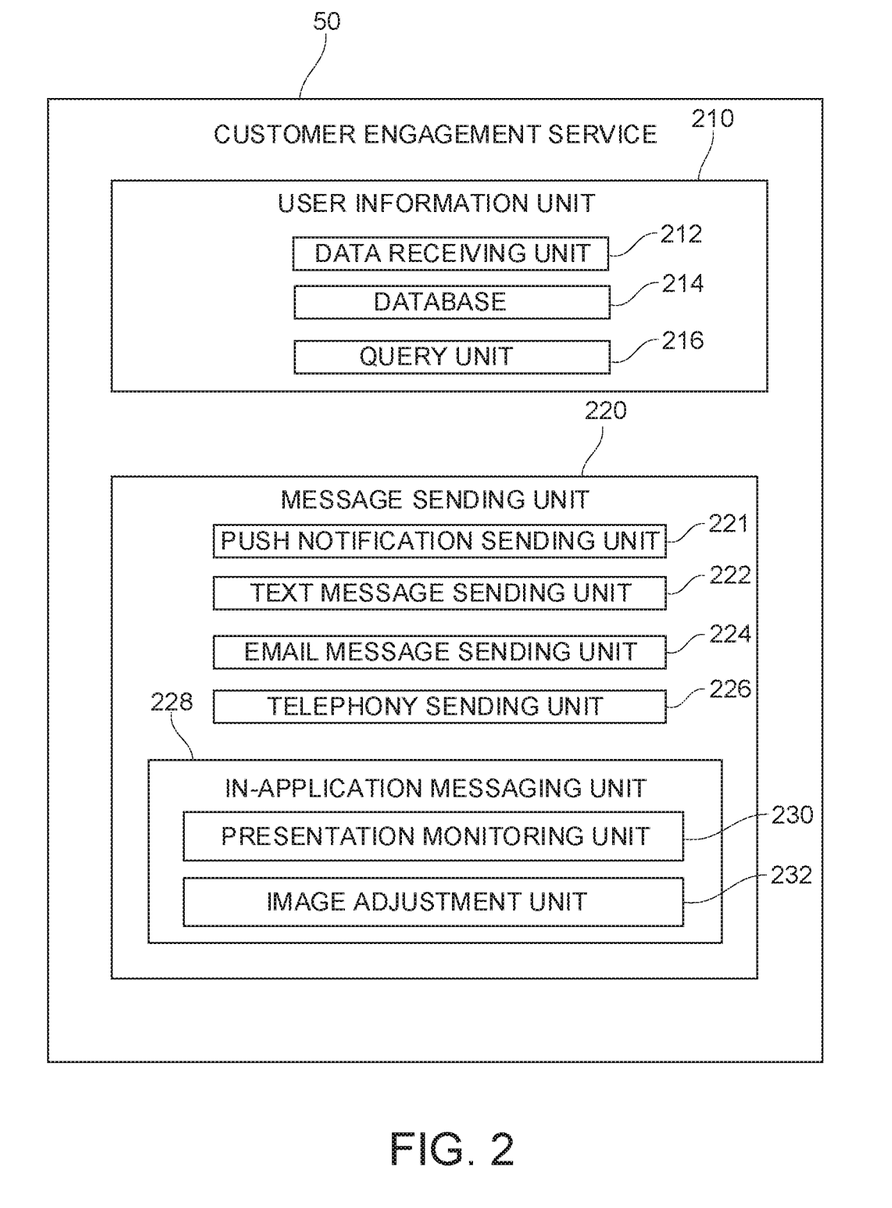
FIG. 2 is a diagram of selected elements of a customer engagement service.

FIG. 2 illustrates selected elements of a customer engagement service 50. The illustration in FIG. 2 is in no way intended to show all elements of a typical customer engagement service 50, and indeed there would typically be many other elements. Likewise, a customer engagement service 50 embodying the invention might not have all the elements illustrated in FIG. 2.

The customer engagement service 50 includes a user information unit 210 that is responsible for receiving and storing information about a client's users, and that is responsible for responding to requests for that stored information. The user information unit 210 includes a data receiving unit 212 that receives various items of information about users, and that stores that received information in databases 214. The information could be received from various sources. However, typically a client would provide information about its users to the data receiving unit 212 via various means.

For example, in some instances a client may send notifications to the data receiving unit 212 each time that one of the client's users engages with the client in some fashion. For example, if the client is an online retailer, each time that a user makes a purchase from the online retailer, the online retailer could send the data about the purchase made by that user to the data receiving unit 212.

In another example, if the client is a media broadcaster, and one of the media broadcaster's users logs onto a website provided by the media broadcaster to access media content, the media broadcaster could send data about that contact to the data receiving unit 212. The data sent could include an identification of the user, the time that the user accessed the website and an indication of what the user accessed or watched while logged into the website. Similarly, any time that a user accesses a client's website, the client could automatically report that user activity to the data receiving unit 212 of the customer engagement service 50.

In yet another example where the client is a media broadcaster, the media broadcaster could have provided a software application to a user that the user has loaded onto a smartphone or a computing device. The software application could be configured to report the actions that a user takes when using the software application directly to the data receiving unit 212 of a customer engagement service 50. Indeed, in any instance where the client has provided a software application to its users, the software application could be configured to report user activity to the data receiving unit 212 of the customer engagement service 50.

Because clients and software applications that the clients provide to their users all report user activity to the customer engagement service 50, the customer engagement service 50 is able to build a detailed picture of each user, the user's preferences, and the user's typical courses of action.

In addition, because the customer engagement service 50 is tasked by its client with the delivery of messages to the client's users, the customer engagement service 50 is also able to build up a record of how and when individual users react to a sent message. This could include an indication of when a user opens a sent message after delivery, and whether and when the user takes an action in response to receipt of a message. For example, because the data receiving unit 212 is also receiving information from the client regarding user contacts with the client, the customer engagement service 50 may learn that shortly after an individual user received a message from the client, the user logged into the client's website. Or that shortly after the user received a message, the user opened a software application provided by the client. For all these reasons, the customer engagement service 50 is able to build detailed user profiles that can be used to predict how individual users will act in certain situations, or how they will respond to certain forms of messaging.

As shown in FIG. 2, the user information unit 210 also includes a query unit 216. The query unit 216 queries the databases 214 to obtain various items of information about the users.

The customer engagement service 50 also includes a message sending unit 220. The message sending unit 220 is responsible for sending messages to a client's users. As explained above, messages could take many different forms and have many different delivery channels. The message sending unit 220 includes a push notification sending unit 221 that causes mobile or browser-based push notifications to be sent to user computing devices via one or more push notification services 40/42, as illustrated in FIG. 1. The push notification sending unit 221 may obtain telephone numbers and push notification service credentials for individual users from the databases 214 with the assistance of the query unit 216. Alternatively, the client may provide that information to the message sending unit 220. The user credential information is then used to cause one or more push notification services 40/42 to deliver a push notification to a user computing device.

The message sending unit 210 may also include a text message sending unit 222 that causes text-based messages to be sent to users. The text-based messages could be traditional SMS/MMS messages, or messages that are delivered to users via an OTT messaging service or perhaps a social networking service. Information needed to send such text-based messages to users may also be obtained from the databases 214 of the user information unit 210, or that information may be provided by the client. Here again, the message sending unit can enlist the services of one or more text-based message delivery platforms to actually send the message to users.

The message sending unit 220 may also include an email message sending unit 224 that causes email messages to be sent to users. The email message sending unit 224 may obtain email addresses and other information, such as user names, for individual users from the databases 214 with the assistance of the query unit 216, or that information may be provided by the client. The information is then used to send email messages to users. The email messages may be delivered to users by one or more third party email services.

The message sending unit 220 may also include a telephony sending unit 226 that is responsible for delivering audio messages to users via a telephony system. For example, the telephony sending unit 226 could generate an audio recording of a message that is to be delivered to users, or the telephony sending unit 226 could receive such an audio message directly from the client. The telephony sending unit 226 would then obtain information about individual customers from the databases 214 with the assistance of the query unit 216, such as user telephone numbers and user names, or that information could be provided by the client. The telephony sending unit 226 would then enlist the aid of an outside service to deliver the audio message to users via a traditional or VOIP telephony system.

In some instances, the telephony sending unit 226 could generate and operate interactive voice response (IVR) applications to deliver such audio messages to users. Doing so may allow a user to request and receive information or services in addition to the original audio message. If a user does interact with an IVR application, how the user interacts with the IVR application could also be recorded in the databases 214 as additional information about the user.

The message sending unit 220 further includes an in-application messaging unit 228. The in-application messaging unit 228 is responsible for causing in-application messages to be presented to a user via a client's software application. For this reason, the in-application messaging unit 228 can interact with an instantiation of a client's software application that is resident on a user's computing device, as will be explained in detail below.

The in-application messaging unit 228 includes a presentation monitoring unit 230 that monitors whether and how instantiations of a client's software application present in-application messages to users. In some instances, the software application can be configured to report in-application message presentation failures to the presentation monitoring unit 230. Such reports may or may not include information about why the presentation failure occurred.

In the following descriptions, we talk of image files, and of potentially reducing the size or resolution of image files to help correct message presentation failures. The term "image" or "image file" in the foregoing and following descriptions is intended to encompass both image files, and media files such as video files.

The in-application messaging unit 228 further includes an image adjustment unit 232. As mentioned above, one reason that in-application message presentation failures occur relates to the size of image files that are sent to the user's computing device and which are used to generate an in-application message. if the presentation monitoring unit 230 determines that there have been consistent message presentation failures for a particular user's software application, the image adjustment unit 232 may reduce the size of some or all of the image files being sent to the user's computing device in an attempt to mitigate the presentation failures. Details of this process are discussed below.

Figure 3:
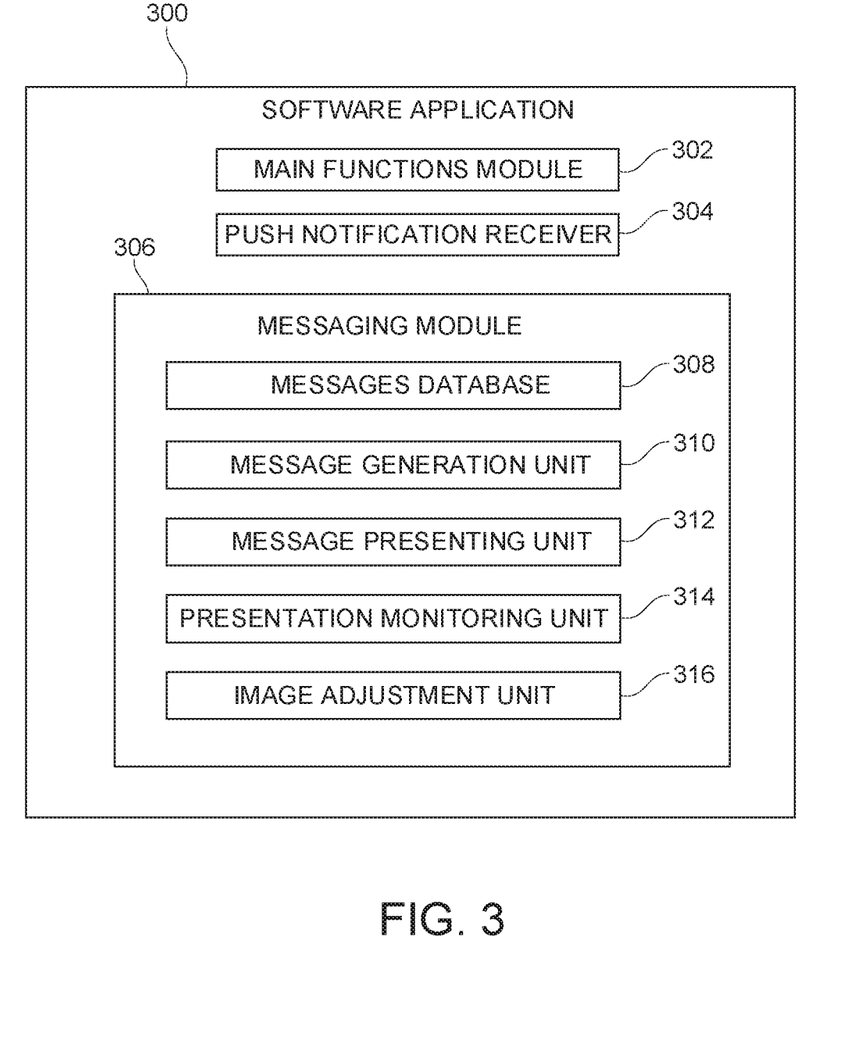
FIG. 3 is a diagram illustrating various elements of a company's software application that is provided to the company's customers.

FIG. 3 illustrates selected elements of a client's software application that would be provided to the client's customers or users. The software application 300 includes a main functions unit 302, which provides one or more functions to the user. The actual function(s) would vary greatly from client to client. For example, if the client is an online retailer, the main functions unit 302 could be configured to allow a user to make online purchases. If the client was a media company, the main functions unit 302 could provide the user with a way of accessing and watching media content provided by the client.

The software application 300 also includes a push notification receiver 304. When the push notification sending unit 221 of a customer engagement service causes a push notification service 40/42 to send a push notification to a user's computing device, the push notification can include information that indicates that the push notification is to be delivered to a specific software application resident on the user's computing device. The push notification itself, or information extracted from the push notification, is provided to the push notification receiver 304 of the software application 300. The push notification can be a silent push notification that is not seen by the user, and which only delivers information and instructions to the software application 300.

The software application 300 also includes a messaging module 306 that is responsible for presenting in-application messages to a user. The messaging module 306 can include message databases 308. The message databases 308 can store pre-configured messages, and/or message templates that can be filled with information to generate in-app messages. The message databases 308 may also store information that indicates which messages have already been presented to the user, and when those messages were presented to the user. The message databases 308 may also include information that can be inserted into a message template to generate an in-application message that is to be presented to the user. For example, the message databases 308 may include various items of information about the user which can be used to personalize an in-application message that is to be presented to the user.

The messaging module 306 further includes a message generation unit 310 which generates in-application messages that are to be presented to the user. The message generation unit 310 may generate an in-application message by obtaining and inserting items of information into a message template. The message template may be stored in the message databases 308, or elsewhere, or the message template may be provided to the messaging module 306 along with instructions to generate and present the in-application message to the user. The information that the message generation unit 310 inserts into a message template could be obtained from the message databases 308, from elements of a customer engagement service 50, from the client that provided the user with the software application 300 or from other third-party sources. In other instances, the message generation unit 310 may obtain specific instructions about how to generate an in-application message, and about what information to include in an in-application message, as part of the received instructions to present the in-application message to the user.

The messaging module 306 also includes a message presenting unit 312 that is responsible for presenting the user with an in-application message. This could include displaying a text or graphical in-application message to a user, playing an audio in-application message to a user or playing a video in-application message to the user. The in-application message may be interactive in nature, meaning that the message presenting unit 312 may operate similar to an interactive voice response system to deliver an in-application message to a user. If there is a message presentation failure, the message presenting unit 312 may report that presentation failure to the presentation monitoring unit 230 of a message sending unit 220 of a customer engagement service 50.

In some embodiments, the messaging module 306 will include a presentation monitoring unit 314 that monitors the presentation of in-application messages and that notes when presentation failures occur. This process will be explained in detail below.

Also, in some embodiments the messaging module 306 also will include an image adjustment unit 316. When the presentation monitoring unit 314 determines that consistent presentation failures are occurring, the image adjustment unit 316 may operate to cause smaller image files to be sent to the software application for use in generating and presenting in-application messages. This could be done by signaling the in-application messaging unit 228 of a customer engagement service 50 to send smaller image files. Alternatively, the image adjustment unit 316 may instruct the message generation unit 310 to generate in-application messages using smaller image files.

With the foregoing as background, we will now turn to a description of various methods embodying the invention. These methods are intended to overcome or mitigate in-application message presentation failures that are occurring because of the size of image files being sent to a software application for use in generating and presenting in-application messages.

Figure 4:
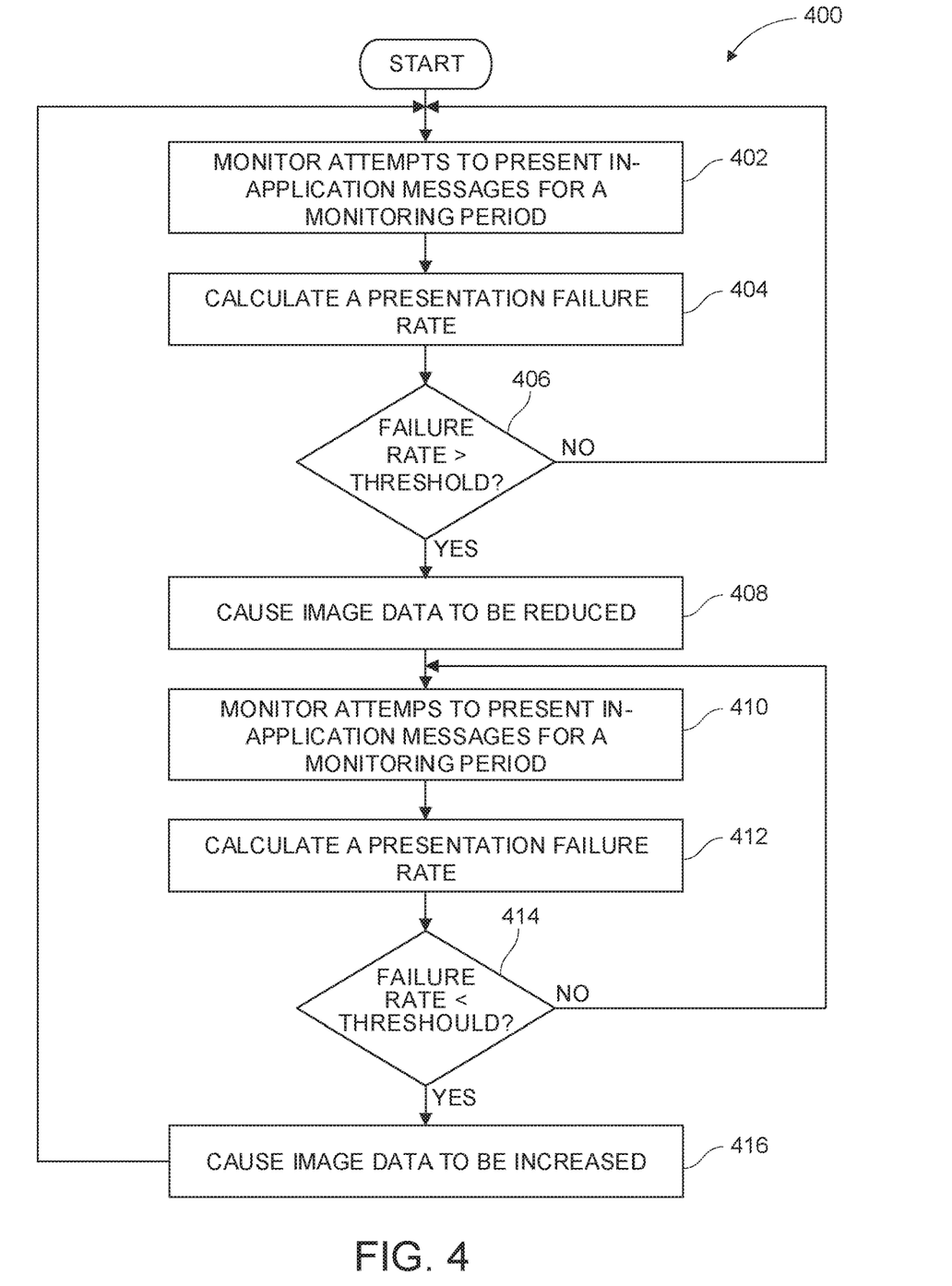
FIG. 4 is a flowchart illustrating steps of a first method embodying the invention that would be performed by elements of a software application.

FIG. 4 illustrates steps of a first method that would be performed by elements of a software application on a user's computing device. The method 400 starts and proceeds to step 402 where a presentation monitoring unit 314 of a messaging module 306 of a software application 300 monitors attempts to present in-application messages to a user during a monitoring period. For example, in some instances, an image or media file may be successfully downloaded to a user's computing device, but memory limitations of the computing device make it impossible to successfully display the image or media file to the user. Such an event would be logged as a message presentation failure. Other errors, such as a corrupted image or media file may also cause a message presentation failure. Alternatively, or in addition, the presentation monitoring unit 314 may monitor attempts to download image or media files to the user's computing device and track the number of download failures that occur. A download failure could be counted as a message presentation failure or download failures may be separately tracked. The length of the monitoring period could be adjustable based upon how frequently the user is being presented with in-application messages. The length of the monitoring period should be long enough that it is possible to draw accurate conclusions about whether there are consistent in-application message presentation failures.

Once the monitoring period has ended, the method proceeds to step 404, where the presentation monitoring unit 314 calculates a message presentation failure rate. The message presentation failure rate could be calculated by dividing the number of presentation failures by the number of message presentation attempts. However, the message presentation failure rate could be calculated in some other fashion taking other or additional items of information into account. For example, the message presentation failure rate could be calculated using only message presentation failures that occurred because of failure to properly load or display an image. In some embodiments, both message presentation failures and file download failures could be treated as equal failures. In other embodiments, message presentation failures may be counted differently than file download failures, or the two types of failures could be combined in a weighted fashion to generate the message presentation failure rate.

The method then proceeds to step 406 where the message presentation failure rate is compared to a threshold value. If the message presentation failure rate is not greater than the threshold value, the method loops back to step 402, and steps 402-406 are repeated. If the message presentation failure rate is greater than the threshold value, the method proceeds to step 408, where the image adjustment unit 316 of the messaging module 306 of the software application 300 causes the size of at least some image files being downloaded and used to generate in-application messages to be reduced. This can be accomplished in multiple different ways.

The threshold value used in step 406 could be adjusted to account for various factors. For example, the worse the data network used to download images is, the lower the threshold value could be set. Similarly, the lower the capability of the user's computing device, the lower the threshold value could be set. Similarly, if the threshold value that is originally used in step 406 fails to cure the majority of the message presentation failures, the threshold value could be set lower. Thus, the initial threshold value that is used may vary from situation to situation based on factors such as data network reliability and speed and user computing device capabilities. Also, the threshold value may be adjusted upward and downward over time in an attempt to cure the majority of message presentation failures. In some embodiments, where image files are being sent to the software application 300 by an in-application messaging unit 228 of a customer engagement service 50, the image adjustment unit 316 sends a message to the in-application messaging unit 228 requesting that smaller image files be sent to the software application 300. Smaller image files could mean smaller images are presented to the user as part of an in-application message. Alternatively, smaller image files could mean lower resolution images will be presented to the user as part of an in-application message.

When the in-application messaging unit 228 receives such a request from the image adjustment unit 316 of the software application 300, the in-application messaging unit 228 may reduce the size of all image files that are subsequently sent to the software application 300. Alternatively, the in-application messaging unit 228 may selectively send some image files that have a normal size and resolution and send other images files at a reduced size or resolution. For example, the in-application messaging unit 228 may send normal size images for those images the in-application messaging unit 228 determines are likely to be viewed by the user and send smaller or lower resolution image files for images that the in-application messaging unit 228 determines are not likely to be viewed by the user.

The in-application messaging unit 228 may determine which images are most likely to be viewed by reviewing impression rates of the in-application messages or images that are attached to a particular messaging campaign. Alternatively, when a messaging campaign is first initiated, early impression rates can be used to make a prediction about which in-application messages or images are most likely to be viewed by users.

In some embodiments, the message generation unit 310 may be directed to acquire images from network storage locations as part of a process of generating an in-application message. In this instance, the image adjustment unit 316 may direct the message generation unit 310 to acquire smaller or lower resolution image files, whenever possible.

After the image adjustment unit 316 acts in step 408 to reduce the sizes of at least some images files being downloaded to the software application, the method proceeds to step 410, where the presentation monitoring unit 314 monitors the presentation of in-application messages during another monitoring period. In step 412, the presentation monitoring unit calculates a new message presentation failure rate using data gathered during the latest monitoring period. In step 414, the newly calculated message presentation failure rate is compared to the threshold value.

If the message presentation failure rate is still greater than the threshold value, the method loops back to step 410, and steps 410-414 are repeated. If the message presentation failure rate is now lower than the threshold value, the method proceeds to step 416 where the image adjustment unit 316 acts to cause the size of at least some image files being downloaded to the software application to increase. The image adjustment unit 316 can act in essentially the same ways discussed above in connection with step 408 to cause the size of some image files being downloaded to the software application to increase. The method then proceeds back to step 402 and the steps discussed above continuously repeat while the software application is loaded and running on the user's computing device.

In the method described above, a message presentation failure rate is compared to a single threshold value. Based on the result of that comparison, the size of at least some image files being downloaded to the software application that are used to generate and display in-application messages is adjusted upward and downward. In alternate embodiments, there may be multiple threshold values to which the message presentation failure rate is compared, and there may be multiple ways of adjusting the size of image files based on the result of that comparison. For example, if the message presentation failure rate is higher than a first threshold value, the image adjustment unit 316 could act to cause only some of the image files being downloaded to the software application to be reduced in size. However, if the message presentation failure rate is higher than a second larger threshold value, the image adjustment unit 316 could act to cause all image files being downloaded to the software application to be reduced in size.

Figure 5:
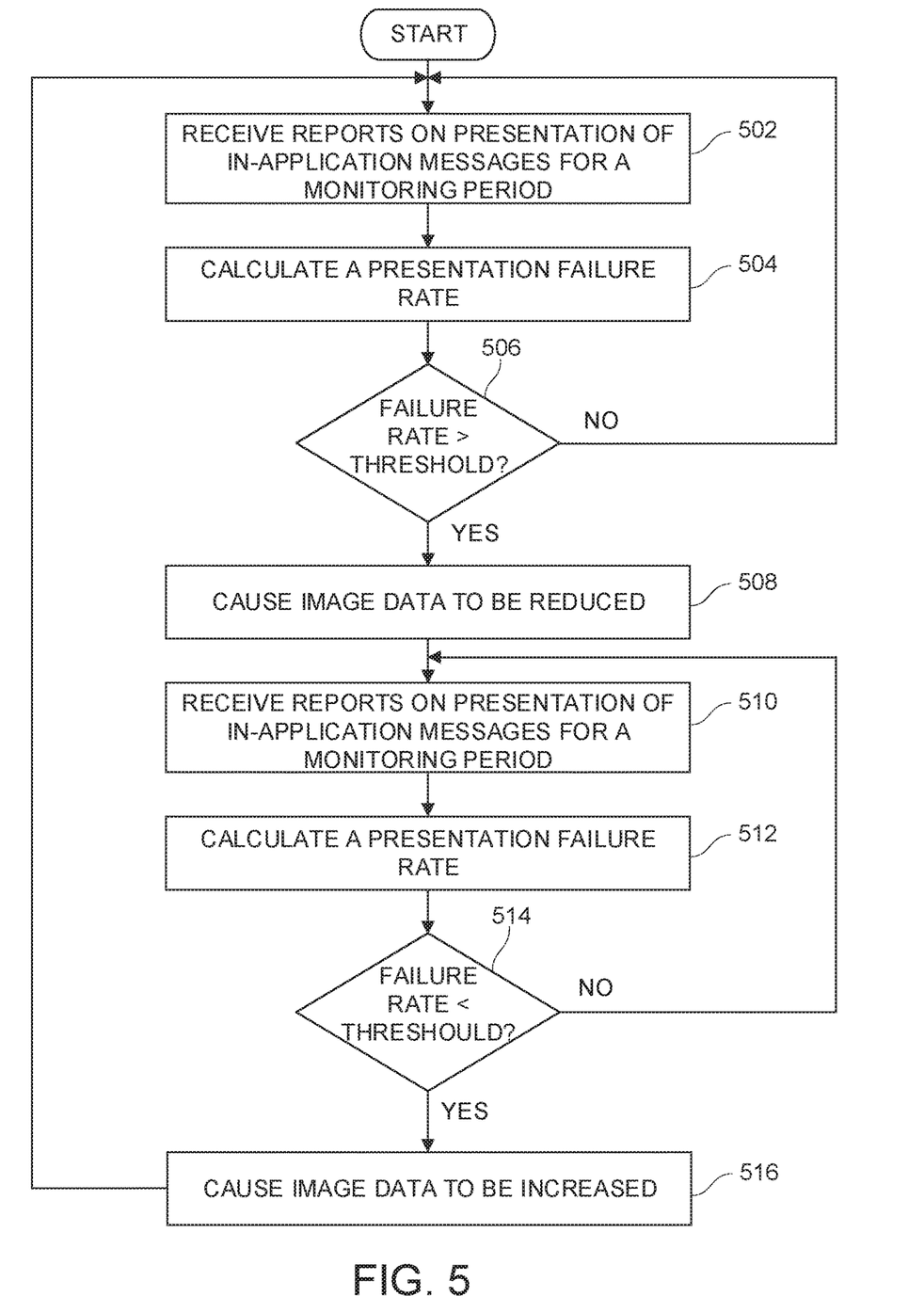
FIG. 5 is a flowchart illustrating steps of another method embodying the invention that would be performed by one or more servers.
Figure 6:
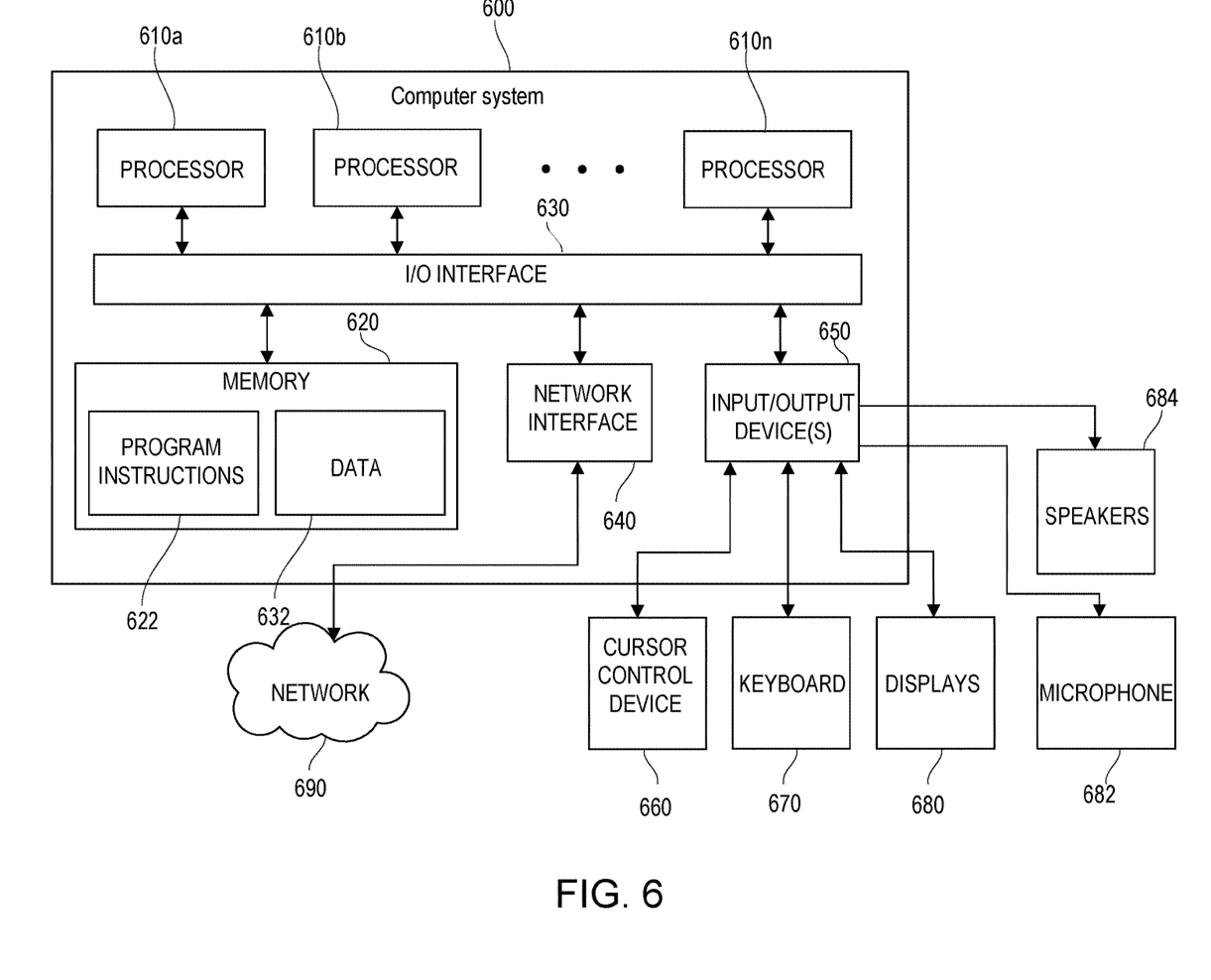
FIG. 6 is a diagram of a computer system and associated peripherals which could embody the invention, or which could be used to practice methods embodying the invention.

In the foregoing method, elements of the messaging module 306 of the software application 300 on the user's computing device monitors message presentation failures and acts to cause the size of image files being downloaded to the software application 300 to be selectively decreased and increased. FIG. 5 illustrates steps of an alternate method 500 in which the monitoring and control are exerted at one or more servers that are separate from the user's computing device. For purposes of the following description, we will assume that the monitoring and control are being exerted by elements of an in-application messaging unit 228 of a customer engagement service 50. However, the one or more servers could also be part of a client's computer system, or part of a third-party service.

The method 500 begins and proceeds to step 502 where a presentation monitoring unit 230 of the in-application messaging unit 228 receives reports about message presentation failures occurring during a monitoring period on a software application 300 on a user's computing device. In some instances, the software application 300 may report on the success or failure of every attempt to present the user with an in-application message. In other embodiments, only message presentation failures are reported to the presentation monitoring unit 230. Also, the software application 300 may report on image or media file download failures. Thus, the presentation monitoring unit 230 may also track the number of download failures that occur. A download failure could be counted as a message presentation failure or download failures may be separately tracked.

Once the monitoring period has ended, the method proceeds to step 504 where the presentation monitoring unit 230 calculates a message presentation failure rate. As with the method discussed above, the message presentation failure rate could be calculated by dividing the number of presentation failures by the number of message presentation attempts. Also, download failures could be counted the same as message presentation failures, or download failures could be counted or weighted differently. The message presentation failure rate also could be calculated in some other fashion taking additional items of information into account. For example, the message presentation failure rate could be calculated using only message presentation failures that occurred because of failure to properly load or display an image.

The presentation monitoring unit 230 may also be capable of tracking message presentation failures and/or file download failures for a user that occur over multiple user devices. The presentation monitoring unit could then use such failures occurring on all of a user's computing devices together to calculate a presentation failure rate for the user. Similarly, the presentation monitoring unit could keep a historical failure rate for a particular user, or for one of the user's computing devices, and depending on what the historical record looks like, weighting may be applied to calculate a current presentation failure rate for the user, or for one of the user's computing devices.

The method then proceeds to step 506 where the message presentation failure rate is compared to a threshold value. If the message presentation failure rate is not greater than the threshold value, the method loops back to step 502, and steps 502-506 are repeated. If the message presentation failure rate is greater than the threshold value, the method proceeds to step 508, where the image adjustment unit 232 of the in-application messaging unit 228 acts to cause the size of at least some image or media files being sent to the software application 300 to be reduced. This can be accomplished in multiple different ways.

In some embodiments, where image files are being sent to the software application 300 by the in-application messaging unit 228, the in-application messaging unit 228 can simply begin sending smaller image files to the user's software application 300. The in-application messaging unit 228 may reduce the size of all image files that are subsequently sent to the software application 300. Alternatively, the in-application messaging unit 228 may selectively send some image files are normal size and resolution and send other images files at a reduced size or resolution.

In some embodiments, the message generation unit 310 of the software application 300 may acquire images from network storage locations as part of a process of generating an in-application message. In this instance, the image adjustment unit 232 may direct the message generation unit 310 to acquire smaller or lower resolution image files, whenever possible.

Also, the foregoing descriptions referred to downloading smaller image or media files to a user's computing device to help cure message presentation failures. In alternate embodiments, instead of downloading smaller files to the user's computing device, a large file could be broken up into two or more smaller files, and the smaller files could then be downloaded to the user's computing device and then be re-assembled on the user's computing device to re-create the original larger file.

After the image adjustment unit 232 acts in step 508 to reduce the sizes of at least some images files being downloaded to the software application 300, the method proceeds to step 510, where the presentation monitoring unit 230 receives reports on image presentation failures occurring on the software application during another monitoring period. In step 512, the presentation monitoring unit 230 calculates a new message presentation failure rate using data gathered during the latest monitoring period. In step 514, the newly calculated message presentation failure rate is compared to the threshold value.

If the message presentation failure rate is still greater than the threshold value, the method loops back to step 510, and steps 510-514 are repeated. If the message presentation failure rate is now lower than the threshold value, the method proceeds to step 516 where the image adjustment unit 232 acts to cause the size of at least some image files being downloaded to the software application 300 to increase. The image adjustment unit 232 can act in essentially the same ways discussed above in connection with step 508 to cause the size of some image files being downloaded to the software application 300 to increase. The method then proceeds back to step 502 and the steps discussed above continuously repeat.

In the method described above, a message presentation failure rate is compared to a single threshold value. Based on the result of that comparison, the size of at least some image files being downloaded to the software application that are used to generate and display in-application messages is adjusted upward and downward. In alternate embodiments, there may be multiple threshold values to which the message presentation failure rate is compared, and there may be multiple ways of adjusting the size of image files based on the result of that comparison. For example, if the message presentation failure rate is higher than a first threshold value, the image adjustment unit 232 could act to cause only some of the image files being downloaded to the software application to be reduced in size. However, if the message presentation failure rate is higher than a second larger threshold value, the image adjustment unit 232 could act to cause all image files being downloaded to the software application to be reduced.

The examples discussed above related to presenting the user with an in-application message. However, the message that is being presented to the user might also be a message that is stored in a message tray of the software application 300. The same principles would apply.

Also, the foregoing descriptions largely referred to image files, and altering the size or resolution of an image file to help correct message presentation failures. The same principles apply equally to other media files, such as video files. Thus, any references to "images" or "image files" in the foregoing descriptions are intended to also apply to and encompass other forms of media files, such as video files.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object-oriented programming language, such as JavaScript, Java®, Swift or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 10 depicts a computer system 1000 that can be utilized in various embodiments of the present invention to implement the invention according to one or more embodiments. The various embodiments as described herein may be executed on one or more computer systems, which may interact with various other devices. One such computer system is the computer system 1000 illustrated in FIG. 10. The computer system 1000 may be configured to implement the methods described above. The computer system 1000 may be used to implement any other system, device, element, functionality or method of the above-described embodiments. In the illustrated embodiments, the computer system 1000 may be configured to implement the disclosed methods as processor-executable executable program instructions 1022 (e.g., program instructions executable by processor(s) 1010) in various embodiments.

In the illustrated embodiment, computer system 1000 includes one or more processors 1010*a*-1010*n* coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, microphone 1082 and speakers 1084. In various embodiments, any of the components may be utilized by the system to receive user input described above. In various embodiments, a user interface may be generated and displayed on display 1080. In some cases, it is contemplated that embodiments may be implemented using a single instance of computer system 1000, while in other embodiments multiple such systems, or multiple nodes making up computer system 1000, may be configured to host different portions or instances of various embodiments. For example, in one embodiment some elements may be implemented via one or more nodes of computer system 1000 that are distinct from those nodes implementing other elements. In another example, multiple nodes may implement computer system 1000 in a distributed manner.

In different embodiments, the computer system 1000 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs). In multiprocessor systems, each of processors 1010 may commonly, but not necessarily, implement the same ISA.

System memory 1020 may be configured to store program instructions 1022 and/or data 1032 accessible by processor 1010. In various embodiments, system memory 1020 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 1020. In other embodiments, program instructions and/or data may be received, sent or stored upon different types of computer-accessible media or on similar media separate from system memory 1020 or computer system 1000.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network (e.g., network 1090), such as one or more external systems or between nodes of computer system 1000. In various embodiments, network 1090 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 10000. In some embodiments, similar input/output devices may be separate from computer system 1000 and may interact with one or more nodes of computer system 1000 through a wired or wireless connection, such as over network interface 1040.

In some embodiments, the illustrated computer system may implement any of the operations and methods described above, such as the methods illustrated by the flowcharts of FIGS. 4-9. In other embodiments, different elements and data may be included.

Those skilled in the art will appreciate that the computer system 1000 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 1000 may also be connected to other devices that are not illustrated, or instead ay operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of causing in-application messages to be presented to a user who is using a software application on a user computing device, comprising:
    monitoring a plurality of attempts to present in-application messages to a user of a software application running on a user computing device over a first monitoring period of time;
    determining when attempts to present the user with in-application messages during the first monitoring period fail;
    calculating a first presentation failure rate which is based on a number of times that an attempt to present the user with an in-application message during the first monitoring period failed and a total number of attempts that have been made to present the user with in-application messages during the first monitoring period;
    comparing the first presentation failure rate to a failure threshold value; and
    causing the amount of data comprising at least some in-application message files downloaded to the software application to be reduced when the first presentation failure rate is determined to be greater than the failure threshold value.

2. The method of claim 1, wherein causing the amount of data comprising at least some of the in-application message files downloaded to the software application to be reduced comprises changing an in-application message media setting of the software application.

3. The method of claim 1, wherein causing the amount of data comprising at least some of the in-application message files downloaded to the software application to be reduced comprises sending a communication to a server that sends in-application messages to the software application.

4. The method of claim 1, wherein causing the amount of data comprising at least some of the in-application message files downloaded to the software application to be reduced comprises causing at least some of the in-application message files that are downloaded to the software application to be reduced.

5. The method of claim 1, wherein causing the amount of data comprising at least some of the in-application message files downloaded to the software application to be reduced comprises causing an image quality of at least some of the in-application message files that are downloaded to the software application to be reduced.

6. The method of claim 1, wherein causing the amount of data comprising at least some of the in-application message files downloaded to the software application to be reduced comprises causing a resolution of at least some of the in-application message files that are downloaded to the software application to be reduced.

7. The method of claim 1, wherein causing the amount of data comprising at least some of the in-application message files downloaded to the software application to be reduced comprises causing the amount of data comprising the in-application message files downloaded to the software application to be reduced only for those in-application message files containing media that is not likely to be presented to the user.

8. The method of claim 1, further comprising:
    monitoring a plurality of attempts to present in-application messages to the user of the software application during a second monitoring period of time;
    determining when attempts to present the user with in-application messages during the second monitoring period fail;
    calculating a second presentation failure rate which is based on a number of times that an attempt to present the user with an in-application message during the second monitoring period failed and a total number of attempts that have been made to present the user with in-application messages during the second monitoring period;
    comparing the second presentation failure rate to a second failure threshold value; and
    causing the amount of data comprising at least some of the in-application message files downloaded to the software application to be increased when the second presentation failure rate is determined to be equal to or less than the second failure threshold value.

9. The method of claim 1, wherein determining when attempts to present the user with in-application messages during the first monitoring period fail comprises determining when there are errors or failures during attempts to download media files to the user computing device.

10. The method of claim 1, wherein monitoring a plurality of attempts to present in-application messages to a user of a software application comprises a presentation monitoring unit of a customer engagement service receiving reports about message presentation failures from an element of the software application on the user computing device.

11. The method of claim 1, wherein monitoring a plurality of attempts to present in-application messages to a user of a software application comprises a presentation monitoring unit of a customer engagement service determining that there have been one or more errors or failures during attempts to download media files to the user computing device.

12. A system for causing in-application messages to be presented to a user who is using a software application on a user computing device, comprising:
    means for monitoring a plurality of attempts to present in-application messages to a user of a software application running on a user computing device over a first monitoring period of time;
    means for determining when attempts to present the user with in-application messages during the first monitoring period fail;
    means for calculating a first presentation failure rate which is based on a number of times that an attempt to present the user with an in-application message during the first monitoring period failed and a total number of attempts that have been made to present the user with in-application messages during the first monitoring period;
    means for comparing the first presentation failure rate to a failure threshold value; and
    means for causing the amount of data comprising at least some in-application message files downloaded to the software application to be reduced when the first presentation failure rate is determined to be greater than the failure threshold value.

13. A system for causing in-application messages to be presented to a user who is using a software application on a user computing device, comprising:
    a presentation monitoring unit that:
        monitors a plurality of attempts to present in-application messages to a user of a software application running on a user computing device over a first monitoring period of time,
        determines when attempts to present the user with in-application messages during the first monitoring period fail, calculates a first presentation failure rate which is based on a number of times that an attempt to present the user with an in-application message during the first monitoring period failed and a total number of attempts that have been made to present the user with in-application messages during the first monitoring period, and compares the first presentation failure rate to a failure threshold value; and an image adjustment unit that acts to cause the amount of data comprising at least some in-application message files downloaded to the software application to be reduced when the first presentation failure rate is determined to be greater than the failure threshold value.

14. The system of claim 13, wherein the image adjustment unit acts to cause the amount of data comprising at least some of the in-application message files downloaded to the software application to be reduced by changing an in-application message media setting of the software application.

15. The system of claim 13, wherein the image adjustment unit acts to cause the amount of data comprising at least some of the in-application message files downloaded to the software application to be reduced by sending a communication to a server that sends in-application messages to the software application.

16. The system of claim 13, wherein the image adjustment unit acts to cause the amount of data comprising at least some of the in-application message files downloaded to the software application to be reduced by causing at least some of the in-application message files that are downloaded to the software application to be reduced.

17. The system of claim 13, wherein the image adjustment unit acts to cause the amount of data comprising at least some of the in-application message files downloaded to the software application to be reduced by causing an image quality of at least some of the in-application message files that are downloaded to the software application to be reduced.

18. The system of claim 13, wherein the image adjustment unit acts to cause the amount of data comprising at least some of the in-application message files downloaded to the software application to be reduced by causing a resolution of at least some of the in-application message files that are downloaded to the software application to be reduced.

19. The system of claim 13, wherein the image adjustment unit acts to cause the amount of data comprising at least some of the in-application message files downloaded to the software application to be reduced by causing the amount of data comprising the in-application message files downloaded to the software application to be reduced only for those in-application message files containing media that is not likely to be presented to the user.

20. The system of claim 13, wherein the presentation monitoring unit also:

monitors a plurality of attempts to present in-application messages to the user of the software application during a second monitoring period of time;

determines when attempts to present the user with in-application messages during the second monitoring period fail;

calculates a second presentation failure rate which is based on a number of times that an attempt to present the user with an in-application message during the second monitoring period failed and a total number of attempts that have been made to present the user with in-application messages during the second monitoring period;

compares the second presentation failure rate to a second failure threshold value; and wherein the image adjustment unit causes the amount of data comprising at least some of the in-application message files downloaded to the software application to be increased when the second presentation failure rate is determined to be equal to or less than the second failure threshold value.

21. The system of claim 13, wherein determining when attempts to present the user with in-application messages during the first monitoring period fail comprises determining when there are errors or failures during attempts to download media files to the user computing device.

22. The system of claim 13, wherein the presentation monitoring unit is a part of a customer engagement service, and wherein monitoring a plurality of attempts to present in-application messages to a user of a software application comprises the presentation monitoring unit receiving reports about message presentation failures from an element of the software application on the user computing device.

23. The system of claim 13, wherein the presentation monitoring unit is a part of a customer engagement service, and wherein monitoring a plurality of attempts to present in-application messages to a user of a software application comprises the presentation monitoring unit determining that there have been one or more errors or failures during attempts to download media files to the user computing device.

* * * * *